United States Patent
Ivantysynova et al.

(10) Patent No.: US 7,356,992 B2
(45) Date of Patent: Apr. 15, 2008

(54) HYDROSTATIC MULTI-MOTOR DRIVE

(75) Inventors: Monika Ivantysynova, West Lafayette, IN (US); Jürgen Weber, Dresden (DE)

(73) Assignee: CNH Baumaschinen GmbH, Berlin (DE)

( * ) Notice: Subject to any disclaimer, the term of this patent is extended or adjusted under 35 U.S.C. 154(b) by 0 days.

(21) Appl. No.: 10/534,729

(22) PCT Filed: Nov. 6, 2003

(86) PCT No.: PCT/DE03/03682

§ 371 (c)(1),
(2), (4) Date: Dec. 22, 2005

(87) PCT Pub. No.: WO2004/048820

PCT Pub. Date: Jun. 10, 2004

(65) Prior Publication Data

US 2006/0162329 A1    Jul. 27, 2006

(30) Foreign Application Priority Data

Nov. 26, 2002   (DE) .............................. 102 55 048

(51) Int. Cl.
*F16D 31/02*   (2006.01)

(52) U.S. Cl. .............................. 60/425; 60/440; 60/490
(58) Field of Classification Search .................. 60/425, 60/439, 440, 452, 484, 485, 490
See application file for complete search history.

(56) References Cited

U.S. PATENT DOCUMENTS 5,159,992 A * 11/1992 Reinecke et al. ............. 60/484
6,874,319 B2 * 4/2005 Nakatani ..................... 60/484

* cited by examiner

*Primary Examiner*—Michael Leslie
(74) *Attorney, Agent, or Firm*—Stephen A. Bucchianeri; John William Stader; Michael G. Harms

(57) ABSTRACT

With a hydrostatic multi-motor drive unit with a least two hydraulic motors acting upon a common load, a solution should be created, with which a further operating range is covered by the use of several motors and at the same time a simple as possible and problem free coupling of the motors is assured. Furthermore, a method for controlling the drive unit is indicated, which permits continuous transitions between the different operating ranges. This is achieved in that the motors (2, 3) are connected with each other through at least one freewheel device (4), in which the motor (2) arranged after the freewheel device has a variable displacement volume.

10 Claims, 4 Drawing Sheets

HYDROSTATIC MULTI-MOTOR DRIVE

BACKGROUND OF THE INVENTION

The present invention relates to hydrostatic multi-motor drive units and, more particularly, to such a unit with at least two hydraulic motors acting upon a common load.

Hydraulic drives with two motors are known in essentially two different versions or designs.

In a first design both drives are rigidly interconnected by a shaft and, hence, both run permanently. In arrangements in which at least one of the motors is designed to be adjustable, and for attaining high speeds, this motor is set to zero by adjusting its displacement volume to zero. It is disadvantageous that the motor which is set to zero is dragged along by the other motor and, as a result of this, high mechanical losses occur.

To avoid such problems, two-motor drive designs are known in which the two motors are interconnected by gears and couplings, so that in the operating ranges in which the adjustable motor is set to zero, this motor can be mechanically disconnected from the second motor. The disadvantage of this solution is in the high complexity of the coupling and arrangement of gears which is necessary in order to guarantee synchronization of the two machines when engaging and disengaging, so that a smooth transition between the various different operating ranges is made possible.

In DE 100 60 679 A1 an additional hydrostatic two-motor drive unit is disclosed in which two motors are connected with at least one coupling. Such a drive unit encounters the above-described disadvantages.

It would be a great advantage to provide a hydrostatic multi-motor drive unit that overcomes the above problems and disadvantages.

SUMMARY OF THE INVENTION

Accordingly, it is an object of the present invention to provide an improved multi-motor drive unit that avoids the above-noted disadvantages.

It is another object of the present invention to provide a multi-motor drive unit which covers a wide operating range through the use of several motors and at the same time guarantees coupling of the motors.

It is a further object of the present invention to provide a multi-motor drive unit that is as simple as possible and free from problems.

It is a further object of the present invention to provide a multi-motor drive unit that interconnects the motors through at least one freewheel device, such that the motor arranged behind the freewheel device has a variable displacement volume.

It is a still further object of the present invention to provide a method for controlling a multi-motor drive unit which permits continual transitions between the various operating ranges.

These and other objects are achieved by providing method and apparatus for controlling a hydrostatic multi-motor drive unit which permits continuous transitions between the different operating ranges. This is achieved by interconnecting the motors through at least one freewheel device, in which the motor arranged after the freewheel device has a variable displacement volume.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Figure 1:
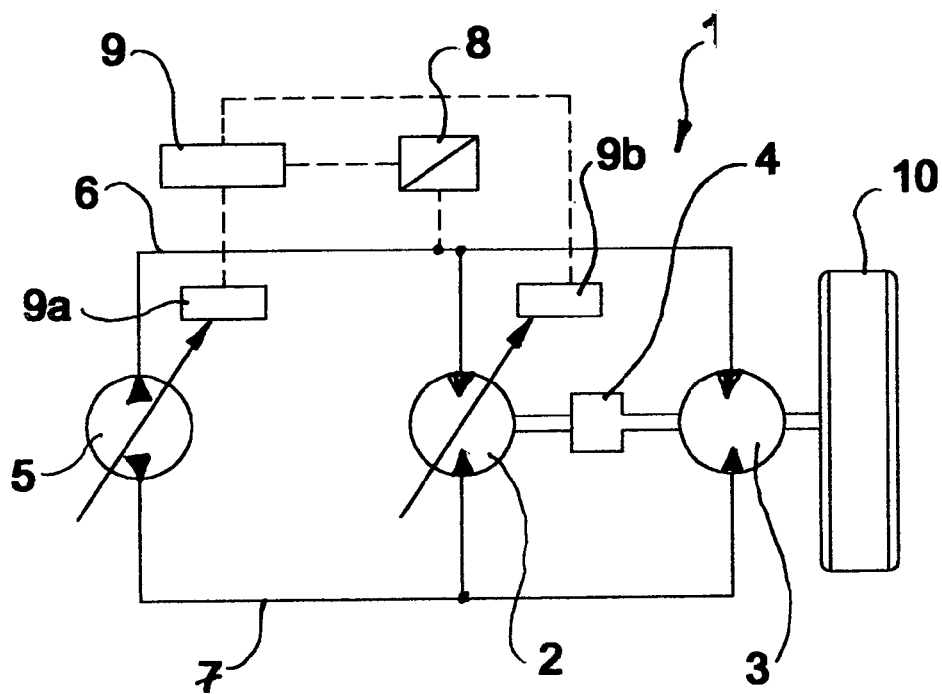
FIG. 1 is a diagrammatic overview of a multi-motor drive unit in accordance with the invention with an adjustable motor.

Referring to FIG. 1, a multi-motor drive unit in accordance with the invention, generally designated by 1, comprises a hydraulic motor 2 which is variable in its displacement volume and a hydraulic motor 3 with a constant displacement volume. These are interconnected via a mechanical freewheel device 4. A variable displacement hydraulic pump 5 provides the hydraulic circuit with pressure medium via pipes 6 and 7.

At least one pressure sensor with a measurement signal transformer 8 measures the pressure in the hydraulic circuit and passes it on in the form of an electrical signal to a control unit 9. This calculates from the measured parameters of status in the circuit and the desired values prescribed by the user, the correcting signals, and with these adjusts the volume of the variable motor 2 through the motor controller 9b and with the pump controller 9a adjusts the displacement volume of the variable displacement pump 5.

Thus, depending upon the volume flow of pump 5 and the motor volume of the adjustable motor 2, a rotational speed of the motors is set. Depending upon the setting of the adjustable motor 2, the volume flow of pump 5 is divided between the two motors 2 and 3, in which, because of the parallel circuit of the motors, the same pressure difference is applied to both motors and the freewheel device is locked and at the same time the torque of both motors is transmitted to the driving axle, until the torque given out by the adjustable motor is zero and this is, then, at a standstill. Thus, both motors 2 and 3 together drive a load 10, e.g. the running gear of a vehicle.

Figure 2:
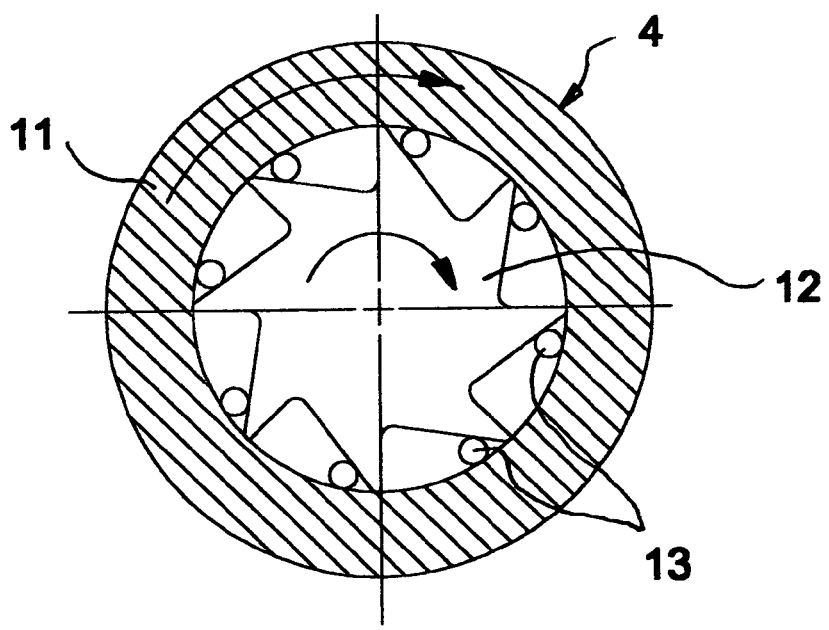
FIG. 2 is a cross section through a freewheel device depicted as an example for the solution of the multi-motor arrangement in accordance with the invention.

The freewheel device 4 consists, as depicted in FIG. 2, as an example of an outer ring 11, which is connected non-positively with the motor on the load side. In the center of the ring 11 there is a star-shaped wheel 12, which is connected to the adjustable motor 2. If the star-shaped wheel 12 is driven, the metal balls 13 rolling on the outer surface of the crank become jammed against the inner surface of the ring 11 and thus effect a transmission of power from the star-shaped wheel 12 to the outer ring 11. If the outer ring 11 is moving faster than the star-shaped wheel 12, the balls fall into recesses in the wheel 12 and there is no transmission of motion from the outer ring 11 to the star-shaped wheel, so that the ring 11 can turn freely in this direction.

Figure 3:
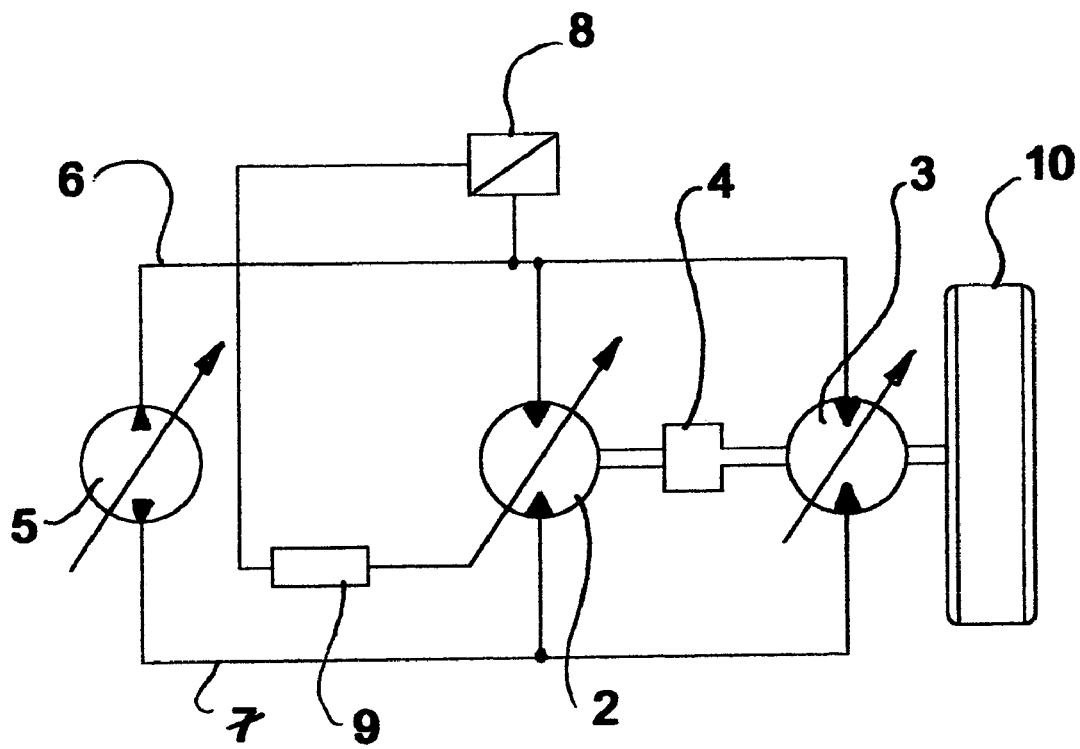
FIG. 3 is a diagrammatic overview of the multi-motor drive unit with two adjustable motors.

An alternative possibility, in which both motors are variable, is depicted in FIG. 3. Here, as well as the first variable motor 2, also the motor on the load side 3' is variable and can be adjusted by the controller 9, depending on the current state of the drive unit and the desired set parameters. Thus, it is possible to further increase the operating range of the drive unit.

Figure 4:
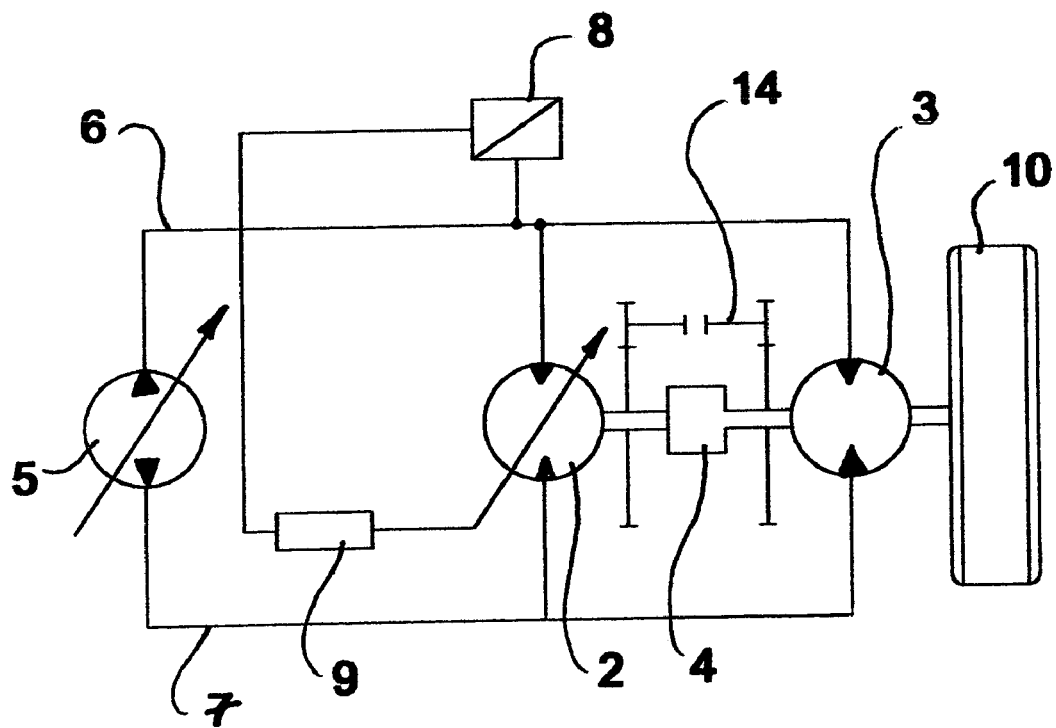
FIG. 4 is a depiction of the multi-motor drive with a switchable coupling.

When traveling backwards no transmission of power through the freewheel device 4 from the motor 2 to the load 10 is possible. For the case when operating backwards the same maximum torque should be available at the load as in forwards operation, a controllable clutch 14 in parallel with the freewheel device is envisaged, as depicted in FIG. 4. This is closed in reverse operation and thus makes possible transmission of power from motor 2 via motor 3 to the load 10 also the freewheeling direction of the freewheel device 4.

Figure 5:
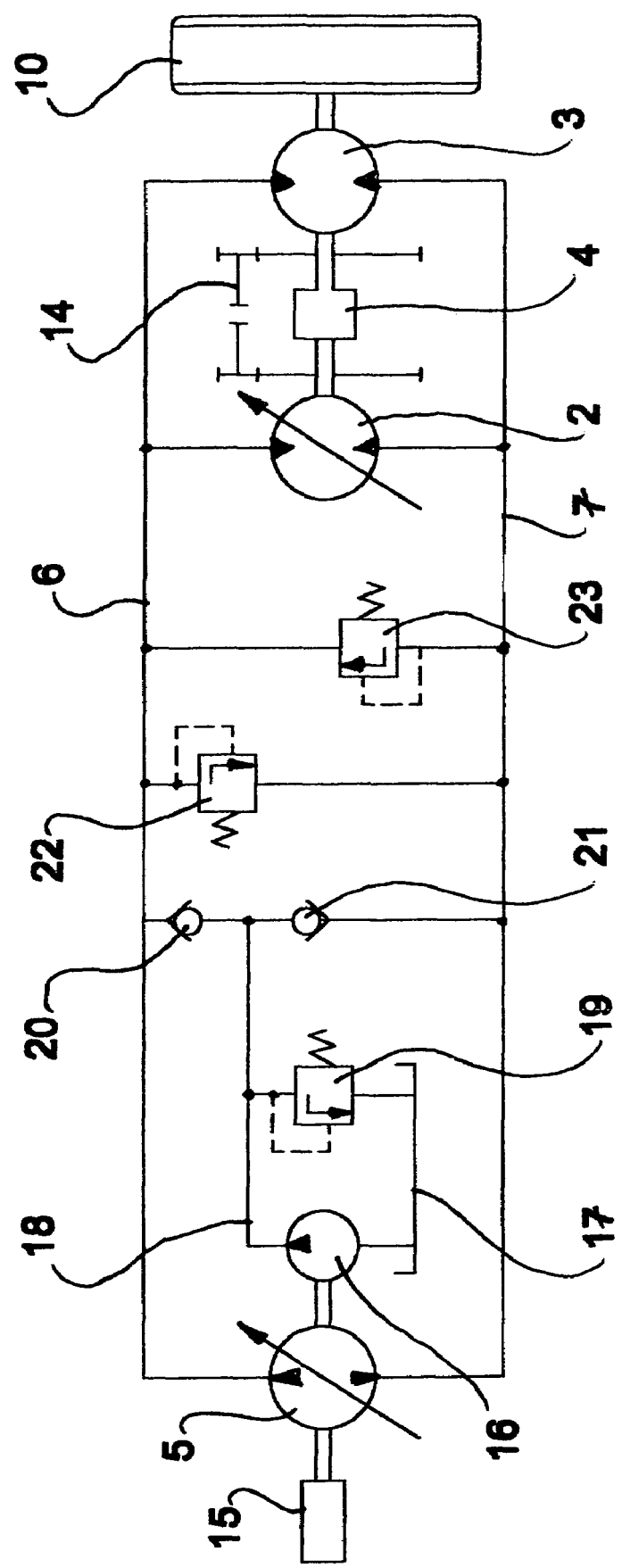
FIG. 5 is a depiction of the hydraulic circuit for a multi-motor drive unit in accordance with the invention.

The construction of the hydraulic circuit is shown in more detail in FIG. 5. An internal combustion engine 15 drives the variable displacement pump 5 and at the same time drives a fixed displacement pump 16, which preloads the low-pressure circuit 18, which consists in its essentials of a pressure medium reservoir 17 and a pressure control valve 19.

The low-pressure circuit 18 is connected with the high pressure circuit via two non-return valves 20 and 21. These are protected against destruction by overpressure in the circuit by two pressure relief valves 22 and 23. Connected to them via the pressure medium pipes 6 and 7 is the driving part with the two hydraulic motors 2 and 3, which are interconnected by the bypassable freewheel device 4 through the controllable clutch 14.

The power transmitted to the load 10 is determined by the variable displacement pump 5, which is driven at a particular rotational speed by the internal combustion engine 15. The emitted volume flow of the pressure medium is determined by setting the displacement volume of pump 5. The ratio of rotational speed and torque this power is transmitted to the load 10 is determined by the setting the motor volume of the variable motor 2.

Figure 6:
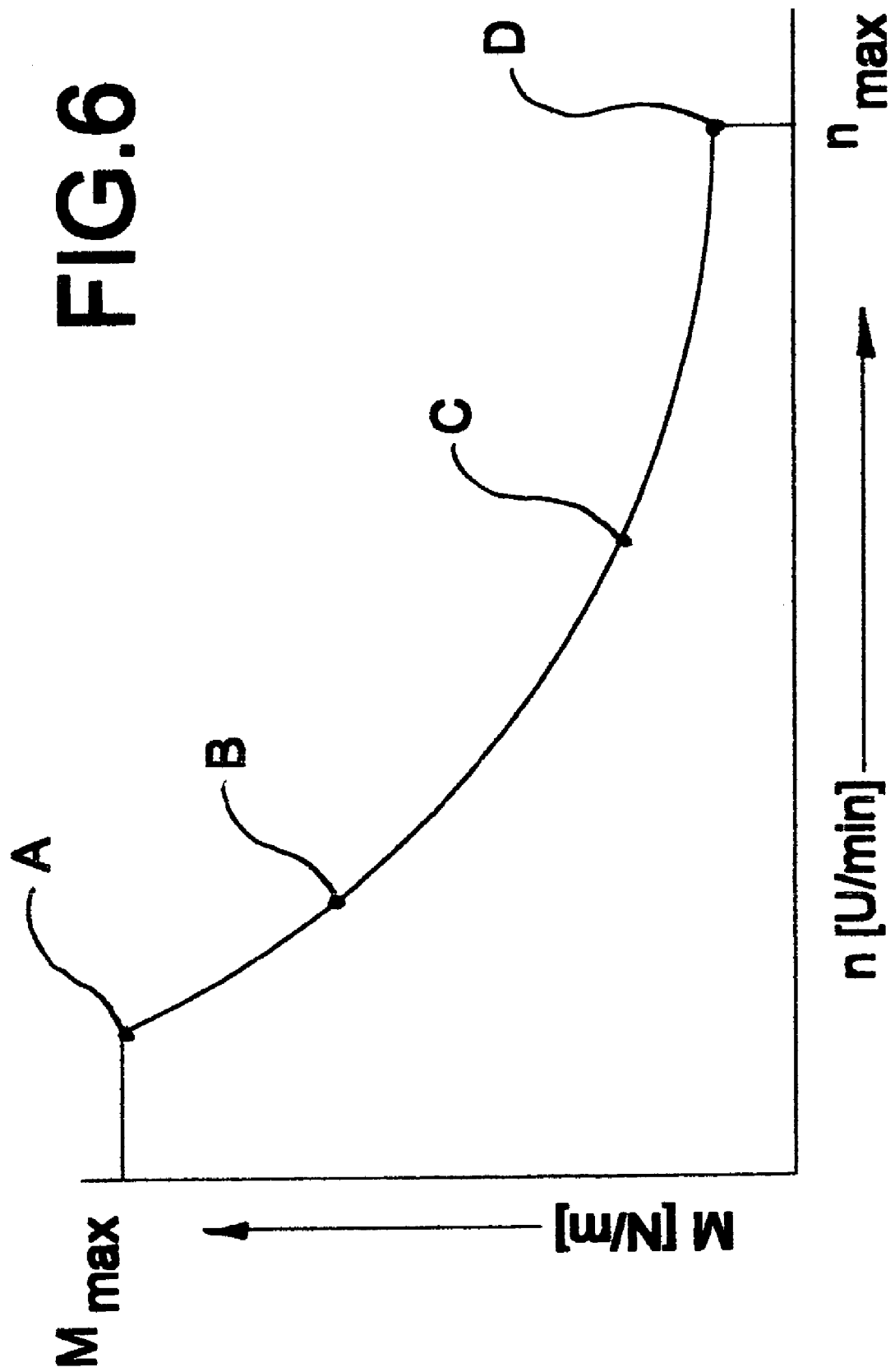
FIG. 6 is a depiction of the driving characteristics of the multi-motor drive.

The characteristic curve of the drive unit 1 in the forwards operation is depicted in FIG. 6 in principle. This shows a diagram in which the torque is conveyed to the load through the rotational speed. For starting up the motor at point A, the displacement volume is increased, for which the motor volume of the variable motor is at a maximum. By increasing the pump volume flow, the rotational speed of the motor increases up to the maximum or to a previously chosen set value of the pump displacement volume at point B. To further increase the rotational speed, the motor volume of the variable motor is reduced, which leads to reduction of the torque delivered to the load. The decrease in motor volume requires that the available volume must flow through the motor volume, which becomes smaller in total for both motors, as a result of which the increase in rotational speed is affected. At point C the volume of the variable motor 2 is reduced to zero, so that the entire available volume flow now flows only through motor 3. In the case that only motor 2 is variable and the pump is already set to maximum displacement volume, the maximum rotational speed is reached. If also motor 3' is variable, this motor volume can likewise be reduced, which brings about a further increase in rotational speed. The maximum rotational speed is then attained at point D, at which the maximum pump volume flows through the minimum motor volume of the variable motor 3' and motor 2 because of its reduced volume of zero stands still, as a result of which it is uncoupled from the load by the freewheel device 4.

The use of several motors offers the advantage that smaller motors can be employed yet, nevertheless, in common operation a high torque is obtainable. In addition, however, through their small construction they enable a high speed which is advantageous, for example, for the rapid travel of mobile machine tools. Through the application of a freewheel device it is possible that all the motors can be run in the blocking direction of the freewheel device for producing a high driving torque. In the ranges of rapid travel, then, the motors arranged behind the freewheel devices with the displacement volumes set to zero, are disconnected by the freewheel device of the motor arranged before the freewheel device, which as a result is provided with the entire volume flow of the pump(s) for attaining a high speed. Thus, with large motor displacement volumes a high torque can be produced at low rotational speeds, and, conversely, increase the speed with a constant supply of pressure medium, if the motor displacement volume is reduced. On reduction of the motor displacement volume to zero, the motors arranged after the freewheel device stand still and then, as long as their displacement volumes remain at zero, are no longer involved in providing driving power.

Problems with synchronization do not occur, since as soon as the displacement volume of the motors arranged behind the freewheel device is increased again, their speed rises until the freewheel device is blocked and the torque produced by the previously disconnected motor is transmitted via the freewheel device to the driving axle, i.e. the torque of all the motors is utilized additively to drive the load.

If a common pressure medium circuit is employed for all of the motors, an equilibrium of forces is established in the entire system and a gentle start up and slowing down of the motor disconnected by the freewheel device is achieved without additional control devices.

With the use of such motors, the advantages of the freewheel device can be utilized particularly favorably, since in the low speed range with high torques the motors are mechanically coupled by the freewheel device. By reducing the motor volume the speed increases until the volume of one of the motors is reduced to zero, so that only the remaining motor, now disconnected by the freewheel, serves for the drive.

The pressure sensor in the pipe(s) between the pump and the motor can distinguish between the operating states of acceleration or deceleration.

A preferred embodiment of the multi-motor drive unit is characterized in that for supplying the motors with pressure medium an adjustable pump is envisaged. The use of an adjustable pump has a series of advantages in comparison with the constant delivery pump with a control valve, i.e. a simple continuously controllable flow of pressure medium which can be utilized for controlling the drive unit. The controllable supply of pressure medium in combination with the motor control offers possibilities for varying the motor power over wide ranges and continuous transfer of power. Furthermore, through dispensing with control valves in the power chain the drive system is very energy efficient because of avoidance of energy losses in the valve arrangements.

In a further embodiment of the invention it is envisaged that the motors are connected in parallel to the freewheel device by a switchable coupling. The parallel switchable coupling makes possible a power transfer also in the direction of the freewheel device. This has the advantage that in cases in which the drive should possess a comparable performance characteristic both in the forwards and backwards direction, the freewheel device can be bypassed. Thus, also in both directions all of the motors present can be operated together and a correspondingly high torque is available at the driving axle.

To solve the problem posed, the invention proposes also a process for influencing the power and/or the direction of rotation of the drive unit, which consists in that the displacement volume of the pump changes and/or the volume of a motor is adjusted and/or the volume of further motors is adjusted and/or the coupling is locked. To accelerate a multi-motor drive unit in the forwards direction, first the displacement volume of the pump is increased, to further increase the speed the volume of the motor arranged after the freewheel device is reduced and if necessary the volume of the further motors arranged after the freewheel device is reduced.

Through increasing the displacement volume of the pump the flow of pressure medium through the motors increases, which leads to acceleration of the drive unit. If the speed is to be further increased, the volume of a first motor is reduced, which with a constant flow of pressure medium to this motor leads to an increase in speed with decreasing driving torque. If several mechanically coupled motors are depending upon the same pressure medium circuit the flow of pressure medium is redistributed with a reduction in the volume of one motor, in which a greater part of the pressure medium flows to the motors with constant volume, which overall leads to an increase in the speed of all the motors. If the volume of one motor is reduced to zero, pressure medium no longer flows through it, it no longer contributes driving torque and can also no longer be driven by the remaining motors arranged ahead of the freewheel device in the direction of freewheeling, so that it remains disconnected by the freewheel device and stands still and the entire flow of pressure medium flows through the remaining motors.

The maximum rotational speed is reached if for maximum displacement volume of the pump the volume of all the motors is reduced to the minimum value and in the extreme case all but one motor stands still and the remaining motor disconnected by the freewheel device from the stationary motors runs at maximum speed because of the minimum total flow of pressure medium, which differs from zero.

A further mode of operating according to the invention serves for decelerating a multi-motor drive unit, and is characterized in that the pump works as a motor, all of the motors arranged ahead of the freewheel device are working as a pump with a displacement volume greater than zero, and the volume of the further motors arranged after the freewheel device is set to zero.

With this procedure it is possible to achieve an especially energy-saving deceleration of the drive unit. In doing so, the power transmitted in motor operation of the pumps to their drive shaft can be utilized for driving further mechanical components, and need not be converted into heat. In order to achieve this, the desired decelerating behavior of the drive unit must be achieved through appropriate control measures at the adjustable pumps and motors. Such a condition occurs if the differential pressure applied through the motor(s) reverses its sign and the kinetic energy of the load is given back to the hydraulic circuit. By adjusting the displacement volume of the pump, and when employing a motor controllable by adjustment of the displacement volume ahead of the freewheel device, the deceleration of the drive unit (the load) and the amount of the energy given off to the other consuming units coupled to the pump can be regulated.

A method in accordance with the invention for accelerating the multi-motor drive unit in a reverse direction consists in that the delivery direction of the pump is reversed, the displacement volume of the pump is increased, and for the further increase in the speed when employing an adjustable motor ahead of the freewheel device its displacement volume is reduced. This method serves for the simple operation of the multi-motor drive unit in the reverse direction. Through pumps capable of being adjusted to zero a reversal of the delivery direction of the flow of pressure medium in the circuit is permitted. As a result of this the motors likewise move in the reverse direction. By increasing the displacement volume of the pump and reduction of the displacement volume of the adjustable motor, as already described above, the rotational speed of the drive unit and hence the driven load can be increased.

In addition the invention concerns a process for accelerating the multi-motor drive unit in the reverse direction, which is characterized in that the switchable coupling is closed, in order to bypass the freewheel device in the freewheeling direction and the direction of the delivery of the pump is reversed, the displacement volume of the pump is increased, to further increase the rotational speed the volume of one of the first motors is reduced and if necessary the volume of the further motors is reduced.

So that such a multi-motor drive unit in slow operation possesses the same driving characteristics in the forwards as in the backwards direction, as described above, a coupling can be employed in parallel with the freewheel device. The coupling is then closed for operation in the reverse direction and then the delivery direction of the pump is reversed, as a result of which all the motors are driven with a volume greater than zero by the reverse oil flow in the backwards direction. By increasing the displacement volume of the pump, the rotational speed of the drive can be increased, as the oil flow is automatically divided between the drives. To further increase the rotational speed, then, analogously, to the method in the forwards direction, the volume of the motors is reduced one after the other, until a maximum rotational speed of the entire arrangement is attained.

Naturally, the invention is not limited to the foregoing examples, but it can also be modified in many ways, without departing from the basic concepts. In particular, the number of motors is not restricted to two, but it can perfectly well be more, as a result of which the flexibility of the drive unit is further increased, as a distinctly greater speed range or greater motor torque can be produced. Also, the combination of variable and non-variable motors is not limited to the above example. Furthermore, such a drive unit can be incorporated into general hydraulic circuits, with which the many and diverse hydraulically moved loads present in a vehicle driven in such a manner could be operated with a comprehensive control concept.

Having thus described the invention, what is claimed is:
1. A hydrostatic multi-motor drive unit comprising:
   at least two gearless, hydraulic motors acting upon a common load;
   a closed hydraulic circuit containing said at least two hydraulic motors;
   at least one variable displacement pump in said closed hydraulic circuit for supplying the pressure medium to said at least two hydraulic motors;
   said at least two hydraulic motors interconnected by at least one free-wheel device, with one of said at least two hydraulic motors arranged after said freewheel device; and said hydraulic motor arranged after said freewheel device having a variable displacement volume.

2. The drive unit of claim 1, further including:

at least one pressure sensor in said hydraulic circuit between said at least two hydraulic motors and said variable displacement pump for distinguishing between the operating states of accelerating or decelerating.

3. The drive unit of claim 2, further including:

a controllable coupling interconnecting said at least two hydraulic motors in parallel with said freewheel device.

4. The drive unit of claim 3, wherein:

said at least two hydraulic motors, said freewheel device, and said controllable coupling are arranged in one casing.

5. The drive unit of claim 4, further including:

an electronic control unit connected to and managing the variables of said at least two hydraulic motors and said variable displacement pump.

6. The drive unit of claim 5, wherein:

said electronic control unit comprises a microprocessor.

7. The drive unit of claim 1, further including:

a controllable coupling interconnecting said at least two hydraulic motors in parallel with said freewheel device.

8. The drive unit of claim 7, wherein:

said at least two hydraulic motors, said freewheel device, and said controllable coupling are arranged in one casing.

9. The drive unit of claim 8, further including:

an electronic control unit connected to and managing the variables of said at least two hydraulic motors and said variable displacement pump.

10. The drive unit of claim 9, wherein:

said electronic control unit comprises a microprocessor.

* * * * *